D. DE ROS.
LIQUID FUEL BURNER.
APPLICATION FILED JULY 24, 1915.
1,285,952.
Patented Nov. 26, 1918.
3 SHEETS—SHEET 1.
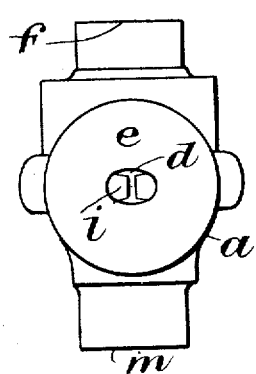
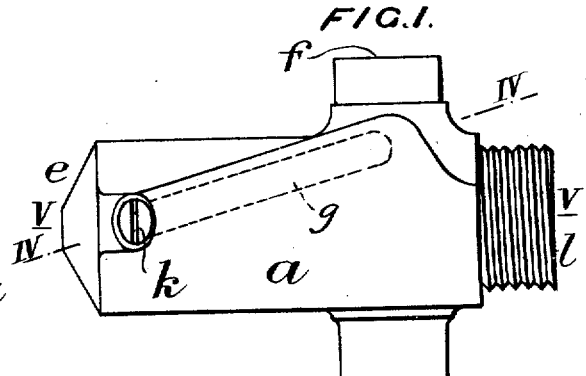
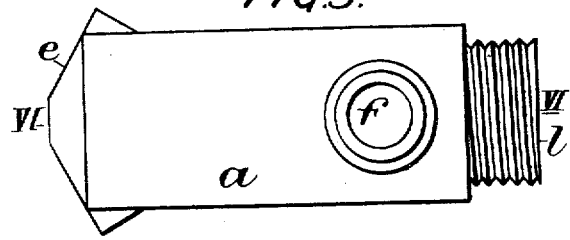
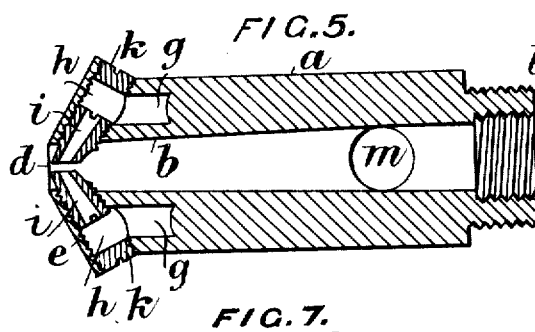
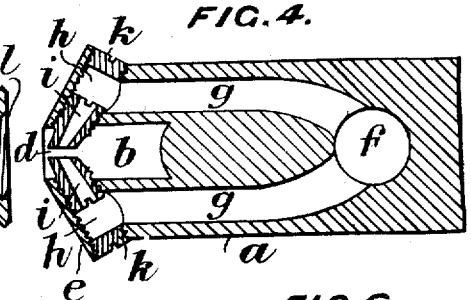
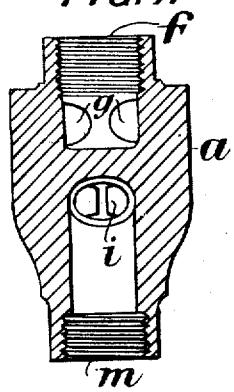
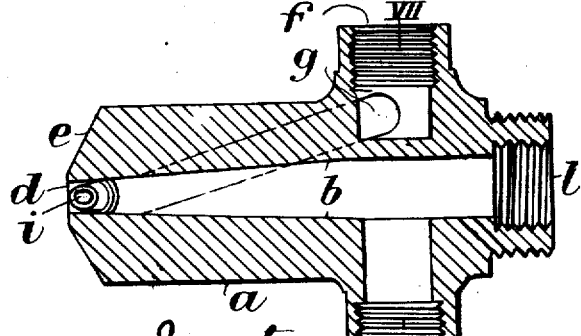
Inventor
Dudley de Ros
By [signature] atty.

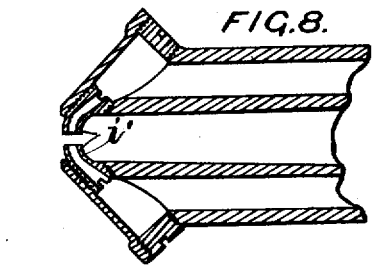
FIG.8. FIG.17. FIG.18.
     
FIG.9. FIG.11. FIG.13. FIG.15. FIG.19. FIG.21.
   
FIG.10. FIG.12. FIG.14. FIG.16. FIG.20. FIG.22.
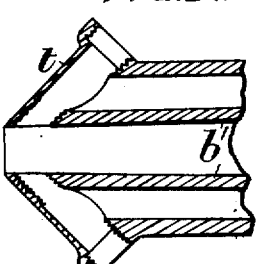 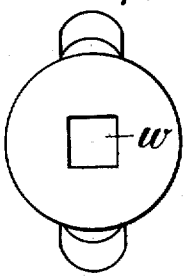 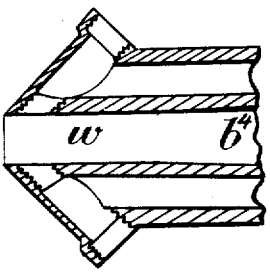
FIG.23. FIG.24. FIG.30. FIG.31.
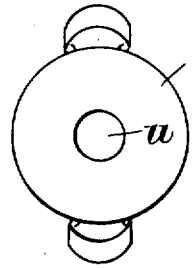 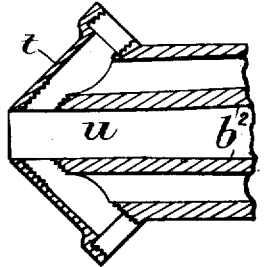 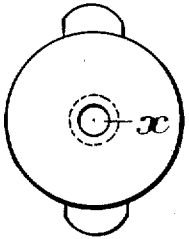 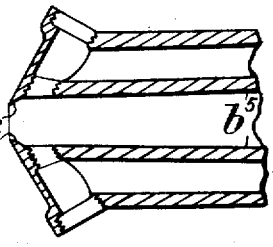
FIG.25. FIG.26. FIG.32. FIG.33.
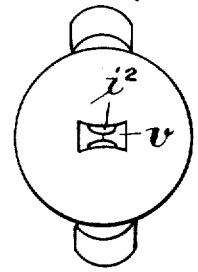 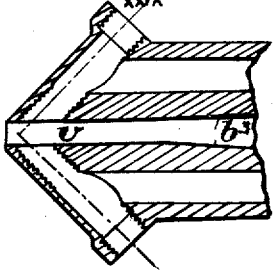 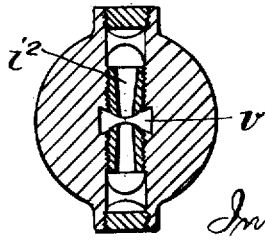
FIG.27. FIG.28. FIG.29.

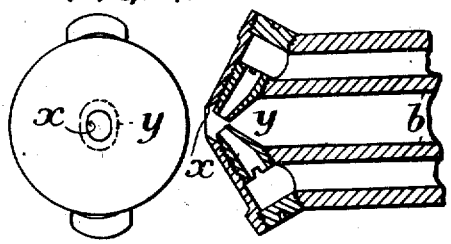
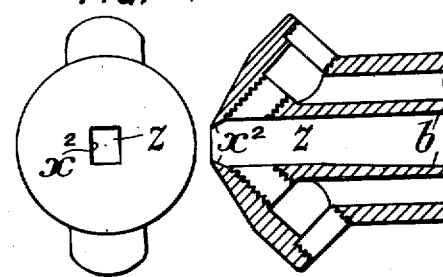
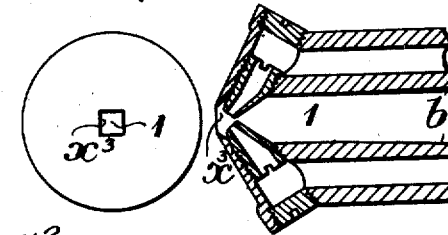
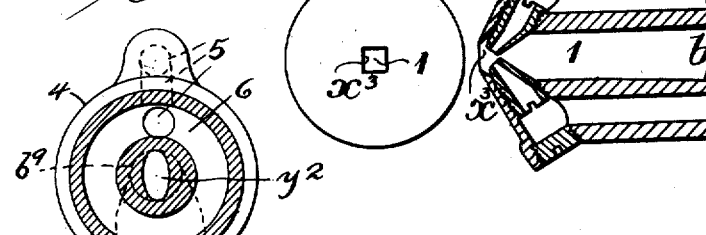
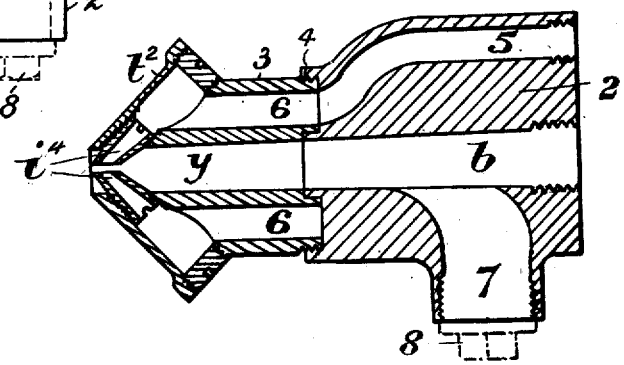

UNITED STATES PATENT OFFICE.

DUDLEY DE ROS, OF ISLINGTON, ENGLAND.

LIQUID-FUEL BURNER.

1,285,952.  Specification of Letters Patent.  Patented Nov. 26, 1918.

Application filed July 24, 1915. Serial No. 41,687.

*To all whom it may concern:*

Be it known that I, DUDLEY DE ROS, a subject of the King of Great Britain, and resident of 31 Gerrard street, Islington, in the county of Middlesex, England, have invented new and useful Improvements in Liquid-Fuel Burners, of which the following is a specification.

The invention has principally for its object to produce a burner which shall be suitable for all classes of furnaces such as blast furnaces, open hearths, reverberatory furnaces, kilns and so on and particularly for heating water to raise steam in the boilers of locomotives, marine engines and stationary engines, such burners being adapted to employ any suitable liquid or semi-liquid fuel such as tar or heavy hydrocarbons. Moreover, the invention has for its object to produce an easily controlled flame of either fan shape or round shape, the flame being soft, voluminous and non-cutting and of the desired dimensions.

The burner is so constructed as to render it possible to use a single burner to a furnace, which burner shall more or less fill the fire-box or charging space with a flame of any desired temperature, and which shall be capable of being controlled at will. Nevertheless the apparatus is so constructed that the flame may be not only of a neutral or reducing character but also be capable of oxidizing, thereby rendering it extremely valuable in connection, for example, with copper refining. The characteristic feature of the flame is its capability of distributing heat uniformly and over a wide or narrow area as required and that with a low consumption of fuel.

According to this invention the burner tube or body portion for the passage of air, steam or other fluid under pressure for a considerable portion of its length is made taper and is provided with radial fuel nozzles which are mounted so that they are in the region of the greatest constriction of area of the bore of the burner tube and adjoining the discharge orifice or their outer parts even partially project just beyond the outside edge of the said discharge orifice, which may have a smaller, but must not have a greater cross-sectional area than any other part of the bore. Moreover the exterior surface of the discharge orifice is preferably also tapered obtusely or chamfered to prevent the fuel in the form of minute particles or spray from collecting thereon and dripping or falling in liquid form, and the mouths of the nozzles may be parallel or inclined to each other. The fuel nozzles, of which there are preferably two, are radially arranged in the burner tube and suitably directed somewhat forward, approximately parallel to the exterior surface of the tapered outlet end of said tube. The invention also comprises minor details, all of which will be hereinafter described with references to the accompanying drawings in which,—

Figure 1 is an elevation of a liquid fuel burner constructed according to this invention.

Fig. 2 is an end view thereof.

Fig. 3 is a plan.

Fig. 4 is a section on the line IV—IV, Fig. 1.

Fig. 5 is a plan section of the line V—V, Fig. 1.

Fig. 6 is a sectional elevation on the line VI—VI Fig. 3, and,

Fig. 7 is a cross section on the line VII—VII, Fig. 6.

Fig. 8 is a sectional elevation of part of the burner tube showing bent nozzles.

Fig. 9 is an elevation of a modified form of oil nozzle to a larger scale, and,

Fig. 10 is a plan thereof.

Figs. 11 and 12, 13 and 14, 15 and 16, 17 and 18, 19 and 20 and 21 and 22 are respectively elevations and plans of other modified forms of nozzles.

Figs. 23 and 24, 25 and 26 are respectively end views and plan sections of various constructions of burner tube.

Fig. 27 is an end view.

Fig. 28 a sectional elevation and

Fig. 29 is a transverse and irregular section on the line XXIX—XXIX, Fig. 28 of another construction of burner tube.

Figs. 30 and 31, 32 and 33, 34 and 35, 36 and 37 and 38 and 39 are respectively end views and plan sections of various other constructions of burner tube, and Fig. 40 is a plan section of a modified form of burner.

Fig. 41 is a transverse section on line XLI—XLI of Fig. 40.

In carrying the invention into effect and according to the construction illustrated in Figs. 1 to 7 of the drawings, the burner tube consists of a piece of metal $a$ having a taper bore $b$ approximately oval in cross-section for the greater part of its length, and oval in cross-section but of uniform dimensions or with parallel sides, in the immediate neighborhood of the discharge orifice $d$. The front $e$ of this burner tube $a$ is chamfered or conical to avoid the collection of drops of fuel thereon, which would carbonize and thus form an objectionable deposit having a deleterious effect on the working of the burner. It has an opening $f$ at the top communicating with the oppositely or equi-distantly arranged passages or ducts $g$ which reach to near the chamfered or coned discharge end of the burner tube $a$ and each of these passages $g$ (which is shown angular to, but which may be parallel to the taper bore $b$) opens into a radial hole $h$ made parallel or approximately parallel to the surface of the discharge end $e$. These holes $h$ are screw-threaded and each hole has screwed therein a tubular nozzle $i$, which internally is suitably circular in cross section and tapered longitudinally toward its discharge end, which projects into the mouth $d$ of the burner tube. The ends of these nozzles $i$ are cut off obliquely so as to be parallel to each other as shown in Fig. 4, or they may be angular to each other, when in position, as shown in Fig. 35 and marked $i^3$, or they may be convex or even concave and preferably the outer edges of their ends are nearly flush with the extreme end of the burner tube $a$. The outer ends of the radial holes $h$ in the burner tube $a$ are plugged with plugs $k$ or otherwise closed. The inlet $l$ for air or steam may be at the rear end of the burner tube $a$ or the rear end may be closed by a plug or cap and the air or steam may be admitted through an orifice $m$ at the bottom of the burner tube. Or the inlet $l$ may be used for air and the inlet $m$ for steam. The liquid fuel is supplied by gravity or otherwise from a tank and if air be used to atomize the fuel it is suitably heated to the temperature at which the fuel is vaporized. The fuel nozzles may be arranged horizontally as shown but in some cases they may lie in a vertical plane. The bore of the nozzles $i$ may be circular, oval, square, oblong or narrower in the middle than at the ends or sides or the bore may for example vary from one end to the other, the bore at or in the neighborhood of the entrance having one section, while the bore at the mouth or discharge orifice is of another section.

As shown in the Figs. 1 to 7, the bore of the nozzles $i$ is oval in cross section and tapers axially, but, as shown in Fig. 8 and in Figs. 9 and 10, to a larger scale, the cross section of the bore of the nozzle $i'$ is rectangular and tapered, the outlet end or mouth being eccentric to the axis of the nozzle and bent in Fig. 8 or the whole nozzle $n$ may be straight as shown in Figs. 9 and 10.

Figs. 11 and 12 show a nozzle also with a taper and rectangular bore in which the outlet or mouth $o$ is central of the nozzle.

Figs. 13 and 14 show the aperture or mouth $p$ more or less segmental.

Figs. 15 and 16 illustrate a nozzle having an aperture or mouth $q$ narrower in the middle than at the ends the longer sides being convex, internally.

Figs. 17 and 18 illustrate a somewhat similar nozzle $q'$ one long side being plane, internally, while the opposite side is convex.

Figs. 19 and 20 show a nozzle with an oval aperture or mouth $r$, and

Figs. 21 and 22 represent a nozzle with a square aperture or mouth $s$.

The bore of the burner tube may be circular, oval, square or oblong in cross section.

As shown in Figs. 23 and 24, the bore $b'$ of the burner tube $a$ is circular in cross section and tapers toward the front or discharge end $t$.

In Figs. 25 and 26 the taper bore $b^2$ merges into the cylindrical bore $u$ at some little distance from the front or discharge end $t'$.

Figs. 27, 28 and 29 show the circular taper bore $b^3$ merging into the bore $v$ which is made with two short parallel sides and two opposite longer and convex sides.

In this example and as shown in Figs. 27 and 29 the ends or mouths of the fuel nozzles $i^2$ are curved. The nozzles are not shown in Fig. 28 so as to render the drawing clearer. It may here be explained that a burner such as described and illustrated in there figures produces a fan-shaped flame.

Figs. 30 and 31 illustrate a tapering bore $b^4$ circular in cross section and merging into the square bore $w$.

Figs. 32 and 33 show a burner tube with slight taper bore $b^5$ which near the outlet or mouth of the burner tube converges more abruptly or to a greater extent as indicated by the letter $x$.

In Figs. 34 and 35 the taper bore $b^6$ merges into the oval bore $y$ of uniform dimensions or parallel sides, and this bore is made abruptly converging at $x'$.

The constructions shown in Figs. 26 and 37 and in 38 and 39 are similar except that in Figs. 36 and 37 the tapered bore $b^7$ merges into the bore $z$ which is oblong in cross section with parallel sides until it merges into the contracted oblong opening at $x^2$. In Figs. 38 and 39 the tapered bore $b^8$ merges into the bore 1 which is square in cross section and merges into the tapered or contracted bore $x^8$ at the discharge end of the burner.

As shown in Fig. 40 the burner comprises a cast metal body conveniently made in two parts 2 and 3 screwed together at 4. The said body part has a circular taper bore $b^9$ for the air or steam under pressure, said taper bore merging into an oval continuation $y^2$. The oil enters at 5 and passes along to the annular chamber 6 and thence to the nozzles $i^4$. If both steam and air be used, air only enters at $b^9$ while the steam is admitted through the lateral branch 7. Or steam may enter at $b^9$ and the air may be supplied through 7. If no pressure fluid is to be admitted at 7, this opening is closed by a plug 8 indicated in dotted lines. The external end $t^2$ of the burner is suitably chamfered and the oil nozzles $i^4$ are mounted as close as possible to and approximately parallel with the end $t^2$, the ends of the nozzles being flush with the extreme end of the burner tube at the discharge end as shown.

I claim:—

1. A liquid fuel burner comprising a head portion having an axial longitudinal passage for fluid under pressure, said passage converging toward its discharge orifice, the end of said head surrounding the discharge orifice being tapered, and radial fuel nozzles in said head having their outlet ends arranged to discharge into said passage in the immediate neighborhood of the discharge orifice.

2. In a liquid fuel burner, a head portion having an axial longitudinal passage for fluid under pressure, said passage converging toward its discharge orifice, the end of said head which surrounds the discharge orifices being tapered, and radial inclined fuel nozzles projecting into said passages and having their axes approximately parallel to the said end and their outlet ends adjoining the discharge orifice.

3. In a liquid fuel burner, a head portion having an axial longitudinal bore for the passage of fluid under pressure, said head and bore converging toward the discharge orifice of the bore and radial inclined fuel nozzles projecting into said bore with their axes approximately parallel to the converging portion of the head, and their outlet ends arranged to discharge into the bore adjacent the discharge orifice.

4. In a liquid fuel burner, a head portion having an axial longitudinal tapering bore, for the passage of fluid under pressure, said head having its end tapered toward the discharge orifice of the bore, the conicity of the taper being more obtuse than that of the taper of the bore, and radial fuel nozzles projecting into the tapered bore with their axes approximately parallel to the tapered portion of the head and their outlet ends arranged to discharge into the bore.

5. In a liquid fuel burner, a head portion having an axial longitudinal tapered bore for the passage of fluid under pressure, said head portion being externally tapered toward the discharge orifice and having an opening for the entrance of the liquid fuel, passages communicating with said opening, and radial fuel nozzles communicating with said passages projecting into the tapered bore and having their outlet ends arranged to discharge into the bore in proximity to the discharge orifice.

6. In a liquid fuel burner, a head portion having an axial longitudinal tapered bore for the passage of fluid under pressure, said head portion being tapered externally toward the discharge orifice and having an opening for the entrance of the liquid fuel, passages communicating with said opening, radial fuel nozzles communicating with said passages and having their outlets projecting into the tapered bore of said head portion and adjoining the discharge orifice, the axes of said nozzles being approximately parallel to the externally tapered portion of the head.

7. In a liquid fuel burner, a head portion having an axial longitudinal tapered bore for the passage of fluid under pressure, said head having its end tapered externally toward the discharge orifice of the bore, means for admitting pressure fluid at the end remote from the discharge orifice, an opening for the inlet of liquid fuel, passages communicating with the said opening, radial fuel nozzles communicating with said bore and having their outlets projecting into the tapered bore of the head portion and adjoining the discharge orifice, the axes of the said nozzles being approximately parallel to the tapered portion of the head.

8. In a liquid fuel burner, a head portion having an axial longitudinal tapered bore for the passage of fluid under pressure, said head portion being tapered externally toward the discharge orifice of the bore, means for admitting air under pressure, means for admitting steam to said bore at a place remote from the discharge orifice, an opening for the inlet of liquid fuel, passages communicating with said opening, radial fuel-nozzles communicating with said passages and having their outlets projecting into the tapered bore and adjoining the discharge orifice, the axes of the said nozzles being approximately parallel to the externally tapered portion of the head.

9. In a liquid fuel burner, a head portion having an axial longitudinal tapered bore for the passage of fluid under pressure, said head portion being tapered externally toward the discharge orifice of the bore, means for admitting air under pressure at the end remote from the discharge orifice, an opening for the inlet of liquid fuel, passages communicating with the said opening, radial fuel nozzles communicating with said passages, said nozzles having their outlet ends parallel to each other, projecting into the said tapered bore and adjoining the discharge orifice and the axes of the said nozzles being approximately parallel to the externally tapered portion of the head.

DUDLEY DE ROS.

Witnesses:
P. PHILLIPS,
ROBERT F. THOMPSON.